(12) United States Patent
Tarafder et al.

(10) Patent No.: US 11,041,834 B2
(45) Date of Patent: Jun. 22, 2021

(54) HIGH SURFACE AREA CHROMATOGRAPHIC DEVICE WITH LOW PRESSURE DROP

(71) Applicant: Waters Technologies Corporation, Milford, MA (US)

(72) Inventors: Abhijit Tarafder, Franklin, MA (US); Moon Chul Jung, Waltham, MA (US); Edouard S. P. Bouvier, Stow, MA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 94 days.

(21) Appl. No.: 16/292,610

(22) Filed: Mar. 5, 2019

(65) Prior Publication Data

US 2019/0277816 A1 Sep. 12, 2019

Related U.S. Application Data

(60) Provisional application No. 62/639,170, filed on Mar. 6, 2018.

(51) Int. Cl.
*G01N 30/60* (2006.01)
*B01L 3/00* (2006.01)
(Continued)

(52) U.S. Cl.
CPC ...... *G01N 30/6095* (2013.01); *B01L 3/50273* (2013.01); *B01L 3/502761* (2013.01);
(Continued)

(58) Field of Classification Search
CPC .......... G01N 30/6095; G01N 30/6069; G01N 30/6086; G01N 30/6065; G01N 30/6073;
(Continued)

(56) References Cited

U.S. PATENT DOCUMENTS 5,593,565 A * 1/1997 Ajdari .................... B01D 17/06
204/601
5,976,336 A * 11/1999 Dubrow .............. B01L 3/50273
204/453

(Continued)

FOREIGN PATENT DOCUMENTS

WO 2013/126774 A2 8/2013

OTHER PUBLICATIONS

Wouters et al. Design of a microfluidic device for comprehensive spatial two-dimensional liquid chromatography. J. Sep. Sci. 2015, 38, 1123-1129. (Year: 2015).*

(Continued)

*Primary Examiner* — Katherine Zalasky McDonald
(74) *Attorney, Agent, or Firm* — Schmeiser, Olsen & Watts LLP; Victor J. Baranowski (57) ABSTRACT

A chromatographic device includes a primary channel having a cross-sectional area and characteristic length such that analyte travel within the primary channel is substantially convective. A plurality of secondary channels each having a cross-sectional area and characteristic length such that analyte flow into and out of a secondary channel is substantially diffusive, each of the plurality of secondary channels having an entrance in fluidic communication with the primary channel wherein the entrance intersects the primary channel.

21 Claims, 10 Drawing Sheets

(51) Int. Cl.
*G01N 30/02* (2006.01)
*G01N 30/52* (2006.01)
*G01N 30/88* (2006.01)

(52) U.S. Cl.
CPC ..... *G01N 30/6065* (2013.01); *G01N 30/6069* (2013.01); *G01N 30/6073* (2013.01); *G01N 30/6086* (2013.01); *B01L 3/5025* (2013.01); *B01L 2300/0864* (2013.01); *B01L 2300/0883* (2013.01); *B01L 2300/0896* (2013.01); *B01L 2300/16* (2013.01); *B01L 2400/086* (2013.01); *G01N 2030/027* (2013.01); *G01N 2030/521* (2013.01); *G01N 2030/524* (2013.01); *G01N 2030/8881* (2013.01)

(58) Field of Classification Search
CPC ....... G01N 2030/524; G01N 2030/521; G01N 2030/027; G01N 2030/8881; B01L 3/502761; B01L 3/50273; B01L 3/5025; B01L 3/5027; B01L 2300/0864; B01L 2300/0883; B01L 2300/0896; B01L 2300/16; B01L 2400/086
See application file for complete search history.

(56) References Cited

U.S. PATENT DOCUMENTS

| | | | | |
|---|---|---|---|---|
| 6,068,752 | A * | 5/2000 | Dubrow | B01L 3/50273 |
| | | | | 204/450 |
| 7,473,361 | B2 * | 1/2009 | Craighead | B01D 17/06 |
| | | | | 210/321.6 |
| 2002/0058329 | A1 * | 5/2002 | Singh | B82Y 30/00 |
| | | | | 435/287.2 |
| 2003/0155300 | A1 | 8/2003 | Afeyan et al. | |
| 2004/0096960 | A1 * | 5/2004 | Burd Mehta | C12Q 2565/629 |
| | | | | 435/287.2 |
| 2006/0154361 | A1 * | 7/2006 | Wikswo | B01L 3/502746 |
| | | | | 435/289.1 |
| 2014/0116881 | A1 | 5/2014 | Chapman et al. | |

OTHER PUBLICATIONS

Sajeesh et al. Particle separation and sorting in microfluidic devices: a review. Microfluid Nanofluid (2014) 17:1-52. (Year: 2014).*

Kutter, Jorg P. Liquid phase chromatography on microchips. Journal of Chromatography A, 1221 (2012) 72- 82. (Year: 2012).*

Grinias et al. Advances in and prospects of microchip liquid chromatography. Trends Analyt Chem. Author manuscript; available in PMC Jul. 1, 2017. Published in final edited form as: Trends Analyt Chem. 2016 ; 81: 110-117. (Year: 2016).*

Application No. PCT/US2019/020663, International Search Report and the Written Opinion of the International Searching Authority, or the Declaration dated Jun. 14, 2019. 12 pages.

Leary, Thomas F., et al. "Mass transfer in the biomolecular binding of a target against probe molecules on the surface of microbeads sequestered in wells in a microfluidic cell," Lab on a Chip, vol. 15, No. 2, Nov. 14, 2014, pp. 459-477. 19 pages.

International Preliminary Report on Patentability in corresponding PCT Patent Application No. PCT/US2019/020663 dated Sep. 17, 2020. 8 pages.

* cited by examiner

HIGH SURFACE AREA CHROMATOGRAPHIC DEVICE WITH LOW PRESSURE DROP

RELATED APPLICATIONS

This application is a non-provisional patent application claiming priority to U.S. Provisional Patent Application No. 62/639,170, filed Mar. 6, 2018, entitled "A High Surface Area Chromatographic Device With Low Pressure Drop," which is incorporated herein by reference.

FIELD OF THE INVENTION

The inventions relate generally to liquid chromatography. In various embodiments, the inventions relate to chromatographic beds and devices for liquid chromatography.

BACKGROUND

Liquid chromatography traditionally relies upon beds of packed particles for separation of analytes. The advent of increasing economical processes for fabricating micro and nano structures, primarily from the semiconductor industry, has led to an interest in using such structures for other purposes. One idea is to use micro and nano scale channels to carry out chromatographic separation. However, there are many challenges to producing such a chromatographic device.

One of the main challenges in designing chromatographic devices where micro or nano fluidic channels are employed instead of packed particles is to create enough surface area for solute retention, while also maintaining a reasonable permeability through the device. One approach to increasing contact surface area is to increase the number of channels within the device. However, while this approach increases the surface area, it also inherently decreases the permeability, and increases the pressure drop across the device, which makes such approaches impractical if not unusable for many chromatographic applications. What is needed is a solution to this seemingly intractable design problem where increased surface area inherently decreases permeability.

SUMMARY

In brief overview, the invention relates to chromatographic separation, and in various aspects analytical chromatographic separation, using as a stationary phase a chromatographic device comprising microfluidic, nanofluidic, or both, channels. The chromatographic devices of the present inventions comprise one or more primary channels in which convective fluidic flow dominates the flow of the mobile phase and a plurality of secondary channels, intersecting a primary channel, in which diffusive flow dominates the flow of the mobile phase. Analytes in the mobile phase are transported along the primary channel and diffuse into and out of secondary channels, interacting with the surface of the secondary channels and thereby, at least in part, being chromatographically separated.

In an exemplary embodiment, a chromatographic method, comprises: providing a chromatographic device comprising a primary channel, and a plurality of secondary channels each having an entrance in fluidic communication with the primary channel wherein the entrance intersects the primary channel; and introducing an analyte through each of the primary and secondary channels of the chromatographic device, wherein the Péclet number for the analyte in the primary channel is between 1 and 10 and the Péclet number for the analyte in each of the secondary channels is less than 0.2, wherein a diffusion coefficient of the analyte is between about $1\times10^{-7}$ $m^2/s$ to about $1\times10^{-12}$ $m^2/s$.

In addition or alternatively, the method includes moving the analyte through the primary channel at a linear velocity in the range of between about 0.0001 m/s and about 1 m/s.

In addition or alternatively, the analyte transport in the primary channel is at least substantially convective, and the analyte transport in the secondary channel is at least substantially diffusive.

In addition or alternatively, each of the plurality of secondary channels intersects the primary channel at an angle between about 10 degrees and about 90 degrees.

In addition or alternatively, each of the plurality of secondary channels intersects the primary channel at a substantially perpendicular angle.

In addition or alternatively, the primary channel has a cross-sectional area equivalent to a tube having a diameter between about 0.1 micrometers and about 100 micrometers.

In addition or alternatively, the cross sectional area of the primary channel varies along the length of the primary channel.

In addition or alternatively, the chromatographic device has a fluid inlet and a fluid outlet and the primary channel follows a substantially linear path from the inlet to the outlet.

In addition or alternatively, the chromatographic device has a fluid inlet and a fluid outlet and the primary channel follows a path with a series of substantially serpentine turns from the inlet to the outlet.

In addition of alternatively, the chromatographic device has a fluid inlet and a fluid outlet and the primary channel follows a substantially sinusoidal path from the inlet to the outlet.

In addition or alternatively, each secondary channel has a cross-sectional area equivalent to a tube having a diameter between about 4 nanometers and about 500 nanometers.

In addition or alternatively, each secondary channel has a cross-sectional area equivalent to a tube having a diameter between 5 nanometers and about 15 nanometers.

In addition or alternatively, each secondary channel has a cross-sectional area equivalent to a tube having a diameter between 15 nanometers and about 50 nanometers.

In addition or alternatively, each secondary channel has a cross-sectional area equivalent to a tube having a diameter between 50 nanometers and about 500 nanometers.

In addition or alternatively, the secondary channels vary in diameter.

In addition or alternatively, the secondary channels vary in length.

In addition or alternatively, the secondary channels have a closed end.

In addition or alternatively, at least a portion of the surface of the primary channel is surface modified with a material selected to be chromatographically active with the analyte or a substance carrying the analyte.

In addition or alternatively, at least a portion of the surface of at least a portion of the secondary channels is surface modified with a material selected to be chromatographically active with the analyte or a substance carrying the analyte.

In addition or alternatively, the primary channel includes a plurality of channels.

In addition or alternatively, the chromatographic device includes a permeability between $5\times10^{-12}$ and $5\times10^{-10}$ $m^2$ for particles between 1 and 10 µm in size.

In another exemplary embodiment, a chromatographic device, comprises: a primary channel having a cross-sectional area and characteristic length such that analyte travel within the primary channel is substantially convective; and a plurality of secondary channels each having a cross-sectional area and characteristic length such that analyte flow into and out of a secondary channel is substantially diffusive, each of the plurality of secondary channels having an entrance in fluidic communication with the primary channel wherein the entrance intersects the primary channel.

In addition or alternatively, the first opening and the second opening of each secondary channel intersects the primary channel at an angle between about 10 degrees and about 90.

In addition or alternatively, each of the plurality of secondary channels intersects the primary channel at a substantially perpendicular angle.

In addition or alternatively, the primary channel has a cross-sectional area equivalent to a tube having a diameter between about 0.1 micrometers and about 100 micrometers.

In addition or alternatively, the cross sectional area of the primary channel varies along the length of the primary channel.

In addition or alternatively, the chromatographic device has a fluid inlet and a fluid outlet and the primary channel follows a substantially linear path from the inlet to the outlet.

In addition or alternatively, the chromatographic device has a fluid inlet and a fluid outlet and the primary channel follows a path with a series of substantially serpentine turns from the inlet to the outlet.

In addition or alternatively, the chromatographic device has a fluid inlet and a fluid outlet and the primary channel follows a substantially sinusoidal path from the inlet to the outlet.

In addition or alternatively each secondary channel has a cross-sectional area equivalent to a tube having a diameter between about 4 nanometers and about 500 nanometers.

In addition or alternatively, each secondary channel has a cross-sectional area equivalent to a tube having a diameter between about 5 nanometers and about 15 nanometers.

In addition or alternatively, the secondary channels within a set have lengths in the range between about 15 nanometers and about 50 nanometers.

In addition or alternatively, the secondary channels within a set have lengths in the range between about 50 nanometers and about 500 nanometers.

In addition or alternatively, the secondary channels vary in diameter.

In addition or alternatively, the secondary channels vary in length.

In addition or alternatively, the secondary channels have a closed end.

In addition or alternatively, at least a portion of the surface of the primary channel is surface modified with a material selected to be chromatographically active with the analyte or a substance carrying the analyte.

In addition or alternatively, at least a portion of the surface of at least a portion of the secondary channels is surface modified with a material selected to be chromatographically active with the analyte or a substance carrying the analyte.

In addition or alternatively, the primary channel comprises a plurality of channels.

In addition or alternatively, the chromatographic device further comprising a permeability between $5 \times 10^{-12}$ and $5 \times 10^{-10}$ $m^2$ for particles between 1 and 10 μm in size.

In another exemplary embodiment, a chromatographic device, comprises: a plurality of diffusive media elements spaced apart from each other a separation distance to define a primary channel between two respective diffusive media elements, wherein the separation distance is such that analyte transport within the primary channel is substantially convective, wherein each diffusive media element comprises a plurality of secondary channels each having a cross-sectional area and each being in fluidic communication with the primary channel and wherein the cross-sectional area of each secondary channel is such that analyte transport into and out of a secondary channel is substantially diffusive.

In addition or alternatively, each diffusive media element is formed on a substrate comprising a plurality of secondary channels and a partial portion of the primary channel.

In addition or alternatively, the primary channel has a cross-sectional area and the separation distance is such that the primary channel cross-sectional area is equivalent to a tube having a diameter between about 0.1 micrometers and about 100 micrometers.

In addition or alternatively, the primary channel has a cross-sectional area and a length and wherein the separation distance varies such that the primary channel cross-sectional area varies along the length of the primary channel.

In addition or alternatively, the secondary channel cross-sectional area is equivalent to a tube having a diameter between about equivalent to a tube having a diameter between about 4 nanometers and about 500 nanometers.

In addition or alternatively, the secondary channel cross-sectional area is equivalent to a tube having a diameter between about equivalent to a tube having a diameter between about 5 nanometers and about 15 nanometers.

In addition or alternatively, the secondary channel cross-sectional area is equivalent to a tube having a diameter between about equivalent to a tube having a diameter between about 15 nanometers and about 500 nanometers.

In addition or alternatively, the chromatographic device has a fluid inlet and a fluid outlet and the plurality of diffusive media elements are spaced apart from each other such that the primary channel follows a substantially linear path from the inlet to the outlet.

In addition or alternatively, the chromatographic device has a fluid inlet and a fluid outlet and the plurality of diffusive media elements are spaced apart from each other such that the primary channel follows a path with a series of substantially serpentine turns from the inlet to the outlet.

In addition or alternatively, the chromatographic device has a fluid inlet and a fluid outlet and the plurality of diffusive media elements are spaced apart from each other such that the primary channel follows a substantially sinusoidal path from the inlet to the outlet.

In addition or alternatively, each secondary channel within at least a portion of the diffusive media elements has a first opening in fluidic communication with the primary channel wherein the first opening intersects the primary channel at an angle that is substantially perpendicular.

In addition or alternatively, at least a portion of a surface of a primary channel is surface modified with a material selected to be chromatographically active with the analyte or a substance carrying the analyte.

In addition or alternatively, at least a portion of a surface of at least a portion of the secondary channels is surface modified with a material selected to be chromatographically active with the analyte or a substance carrying the analyte.

In addition or alternatively, the secondary channels vary in length.

In addition or alternatively, a surface area of the diffusive media elements is at least ten times a surface area of the primary channel.

In addition or alternatively, the chromatographic device includes a permeability between $5 \times 10^{-12}$ and $5 \times 10^{-10}$ m² for particles between 1 and 10 µm in size.

BRIEF DESCRIPTION OF THE DRAWINGS

The above and further advantages of the inventions may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the inventions.

DETAILED DESCRIPTION

Reference in the specification to "one embodiment," "an embodiment," "one aspect," or "an aspect" means that a particular feature, structure or characteristic described in connection with the embodiment or aspect is included in at least one embodiment or aspect of the teachings. References to a particular embodiment or aspect within the specification do not necessarily all refer to the same embodiment or same aspect.

As used herein, the term "substantially convective flow" means flow where the Péclet number is greater than about 2. As used herein, the term "substantially diffusive flow" means flow where the Péclet number is less than about 0.1.

As used herein the term "chromatographically active" means both of: A) a surface or channel that one or more analytes of interest in the fluid (mobile phase) interact with to sorb and desorb from the surface or channel to produce separation; or B) separation occurring on a surface or channel through purely physical means during, for example, size-exclusion chromatography (SEC).

As used herein, the terms "micro scaled channel" and "microfluidic channel" refer to a channel having a dimension less than about 100 micrometers. As used herein, the terms "nano scaled channel" and nanofluidic channel" refer to a channel having a dimension less than about 500 nanometers.

In various aspects, the present inventions provide a chromatographic device having both a high surface area with acceptable permeability by designs that address the flow regime through the device. The present teachings provide embodiments of chromatographic devices that increase the contact surface area of microfluidic and/or nanofluidic flow channels without decreasing the permeability across the device to impractical levels.

The inventors have discovered that a chromatographic device can be constructed employing micro and/or nano scaled channels with a surface area sufficient for chromatographic separations without a concomitant detrimental decrease in permeability. As described in detail herein below, this is accomplished by providing a combination of primary fluidic flow channels in the chromatographic device dimensioned to create substantially convective flow and secondary channels that the fluid accesses substantially by diffusive flow. Accordingly, in various aspects the present inventions create more surface area through use of secondary channels that do not substantially experience the convective flow but experience the diffusive flow, and which thus do not add to pressure drop and lowered permeability.

In various aspects of the inventions, the nature of flow, e.g., convective, diffusive, can be determined by the Péclet number (a dimensionless number) for the region under consideration. The Péclet number, Pe, can be defined as:

$$Pe = Lv/D \qquad (2)$$

where L is the characteristic length, v the average fluid flow velocity, D the mass diffusion coefficient, Re the Reynolds number and Sc the Schmidt number. In the present inventions, the characteristic length L, can be determined from the cross sectional dimension of a channel.

In various aspects and embodiments, the present inventions provide chromatographic devices configured to receive fluid containing analytes having a fluidic flow velocity in the range between about 0.0001 m/s and about 1 m/s and having a viscosity in the range between about $10^{-4}$ kg/m s and about $2 \times 10^{-3}$ kg/m s and a diffusion coefficient between about $1 \times 10^{-9}$ m²/s to about $1 \times 10^{-10}$ m²/s, the chromatographic devices comprising one or more primary flow channels and a plurality of secondary flow channels, with an inlet intersecting a primary flow channel, where the Péclet number may be between 1 and 10 for a primary flow channel and the Péclet number is less than about 0.2 for the secondary channels when subject to the above-described fluid.

In various embodiments, at least a portion of a surface of at least a portion of the secondary channels is surface modified with a material selected to be chromatographically active with a substance in a chromatographic fluid. In various embodiments, at least a portion of a surface of the primary channels is surface modified with a material selected to be chromatographically active with a substance in the fluid. In various embodiments, the surface modification may be the application of a coating. In various embodiments, the material of the coating may be selected to chemically interact with (or selected to reduce chemical interactions, in the case of SEC) a substance in a chromatographic fluid that is introduced to the chromatographic device. Thus, the surface of at least a portion of the secondary channels and/or primary channels may be functionalized to facilitate chromatographic separation. For example, in various embodiments a secondary channel and/or primary channel surface is functionalized with one or more of reversed-phase functional groups such as alkyl groups ranging from C1 to C30 and aromatic groups, normal-phase functional groups, ion-exchange groups, affinity functional groups, HILIC, SEC or HIC functional groups, silica, diol, and the like. Examples of chromatographically active surface functional groups can be found in U.S. Patent App. No. 2012/0141789, published Jun. 7, 2012, paragraphs [0215]-[0230], which are hereby incorporated by reference.

In various embodiments, the primary channels have a characteristic length between about 0.1 micrometers and about 100 micrometers. In various embodiments, the primary channels have a cross sectional area equivalent to a tube having a diameter between about 0.1 micrometers (about 0.008 μm² in cross-sectional area) and about 100 micrometers (about 7853 μm² in cross-sectional area). In various embodiments, the primary channels have a cross sectional area equivalent to a tube having a diameter between about 0.3 micrometers (about 0.07 μm²) and about 0.5 micrometers (about 0.2 μm²). In various embodiments, the primary channels have a cross sectional area equivalent to a tube having a diameter between about 0.1 micrometers (about 0.008 μm²) and about 10 micrometers (about 78.5 μm²). These ranges may be particularly advantageous for liquid chromatography applications.

For supercritical fluid chromatography (SFC), the primary channels may have a characteristic length between about 0.1 micrometers and 100 micrometers. In various embodiments deployed for SFC, the primary channels may have a cross sectional area equivalent to a tube having a diameter between about 0.1 micrometers (about 0.008 μm2 in cross-sectional area) and about 100 micrometers (about 7853 μm2 in cross-sectional area).

For gas chromatography, the primary channels may have a characteristic length between about 0.1 micrometers and 1000 micrometers. In various embodiments deployed for gas chromatography, the primary channels may have a cross sectional area equivalent to a tube having a diameter between about 0.1 micrometers (about 0.008 μm2 in cross-sectional area) and about 1000 micrometers (about 785,000 μm2 in cross-sectional area).

In various embodiments, the length of a primary channel is selected such that sufficient chromatographic separation of analytes of interest is achieved. For example, in various embodiments, the primary channel length may be between 1 and 100 cm. In other embodiments, the range of 2.5 to 10 cm may be desirable. These length ranges may be particularly advantageous in liquid chromatography. In SFC, primary channel lengths may range between 1 and 100 cm. For gas chromatography, primary channel lengths may range between 1 and 100 m.

In various embodiments, the secondary channels have a characteristic length between about 5 nanometers and about 500 nanometers. In various embodiments, the secondary channels have a cross sectional area equivalent to a tube having a diameter between about 4 nanometers (about 13 nm²) and about 500 nanometers (about 196,000 nm²). In various embodiments, the secondary channels have a cross sectional area equivalent to a tube having a diameter between about 5 nanometers (about 20 nm²) and about 15 nanometers (about 177 nm²). In various embodiments, the secondary channels have a cross sectional area equivalent to a tube having a diameter between about 15 nanometers (about 177 nm²) and about 50 nanometers (about 1960 nm²). In various embodiments, the secondary channels have a cross sectional area equivalent to a tube having a diameter between about 50 nanometers (about 1960 nm²) and about 500 nanometers (about 196,000 nm²). In various embodiments, the secondary channels have a cross sectional area equivalent to a tube having a diameter between about 50 nanometers (about 1960 nm²) and about 100 nanometers (about 7854 nm²). In various embodiments, the secondary channels have a cross sectional area equivalent to a tube having a diameter between about 100 nanometers (about 7854 nm²) and about 200 nanometers (about 31,416 nm²). In various embodiments, the secondary channels have a cross sectional area equivalent to a tube having a diameter between about 200 nanometers (about 31,416 nm²) and about 500 nanometers (about 196,000 nm²). In various embodiments, the secondary channels of the chromatographic device vary in diameter. These ranges may be particularly advantageous for liquid chromatography applications.

For SFC, the secondary channels may have a characteristic length between about 5 nanometers and 2000 nanometers. In various embodiments deployed for SFC, the secondary channels may have a cross sectional area equivalent to a tube having a diameter between about 5 nanometers (about 20 nm²) and about 2000 nanometers (about 3,100,000 nm²).

For gas chromatography, the secondary channels may have a characteristic length between about 5 nanometers and 50 micrometers. In various embodiments deployed for gas chromatography, the secondary channels may have a cross sectional area equivalent to a tube having a diameter between about 5 nanometers (about 20 nm²) and about 50 nanometers (about 2000 nm²).

In various embodiments, the cross-sectional area of the inlet to the secondary channel is selected based on the hydrodynamic radius of one or more analytes of interest.

In various embodiments, the length of a secondary channel is selected based on the diffusivity of one or more analytes of interest. For example, in various embodiments, the lower the diffusivity of an analyte of interest the smaller the length of the secondary channel. In various embodiments, diffusivity may be $10^{-5}$ cm2/sec for small molecules, and far slower for proteins. Contemplated channel lengths for the secondary channels may be between 0.1 to 50 μm for liquid chromatography, 1 and 100 μm for SFC, and 1 and 200 μm for gas chromatography.

In various aspects and embodiments, the present inventions provide chromatographic devices with a permeability greater than or equal to that of a packed-bed chromatographic column containing packing material having an average diameter between about 0.1 micrometers and about 100 micrometers and having the same cross-sectional area and length as the primary channel(s). In various aspects and embodiments, the present inventions provide chromatographic devices with a permeability greater than or equal to that of a packed-bed chromatographic column containing packing material having an average diameter between about 1 micrometers and about 5 micrometers and having the same cross-sectional area and length as the primary channel(s).

In various aspects and embodiments, the present inventions provide chromatographic devices having a permeability of greater than about $5 \times 10^{-12}$ m$^2$ for particles having a size of 1 μm. In various aspects and embodiments, the present inventions provide chromatographic devices having a permeability greater than about $5 \times 10^{-10}$ m$^2$ for particles having a size of 10 μm. In various aspects and embodiments, the present inventions provide chromatographic devices with a permeability of greater than about $5 \times 10^{-12} \sim 5 \times 10^{-10}$ m$^2$ for particles having a size of 1 and 10 μm, respectively.

Various cross sectional shapes of the primary and secondary channels are contemplated. For example, the cross sectional shape of the primary and secondary channels may be circular, ovular, rectangular, square, hexagonal, octagonal or the like. In some embodiments, the secondary channels may have varying cross sectional shapes. In some embodiments, if the chromatographic device includes a plurality of primary channels, their cross sectional shapes may vary. Whatever the cross sectional shapes of the channels, the Péclet number, characteristic lengths, and cross sectional area may be consistent to that which has been described herein above.

The present teachings will now be described in more detail with reference to embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill having access to the teachings herein will recognize additional implementations, modifications and embodiments, as well as other fields of use, which are within the scope of the present disclosure. The preceding descriptions of exemplary Péclet numbers, cross sectional areas, permeability and the like may be applicable to the primary and secondary channels described hereinafter.

Figure 1A:
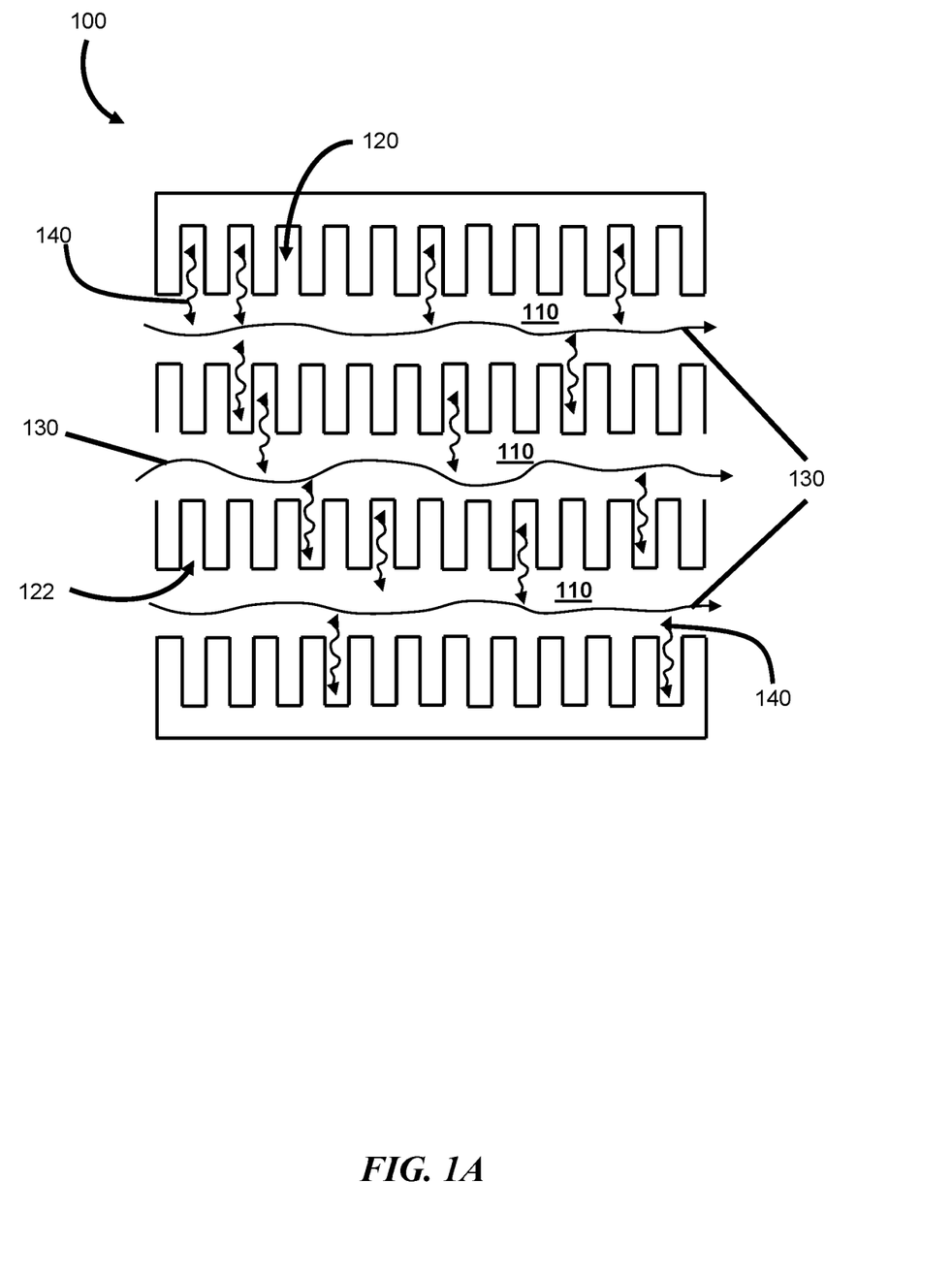
FIG. 1A is a schematic illustration of a chromatographic device according to various aspects and embodiments of the inventions.
Figure 1B:
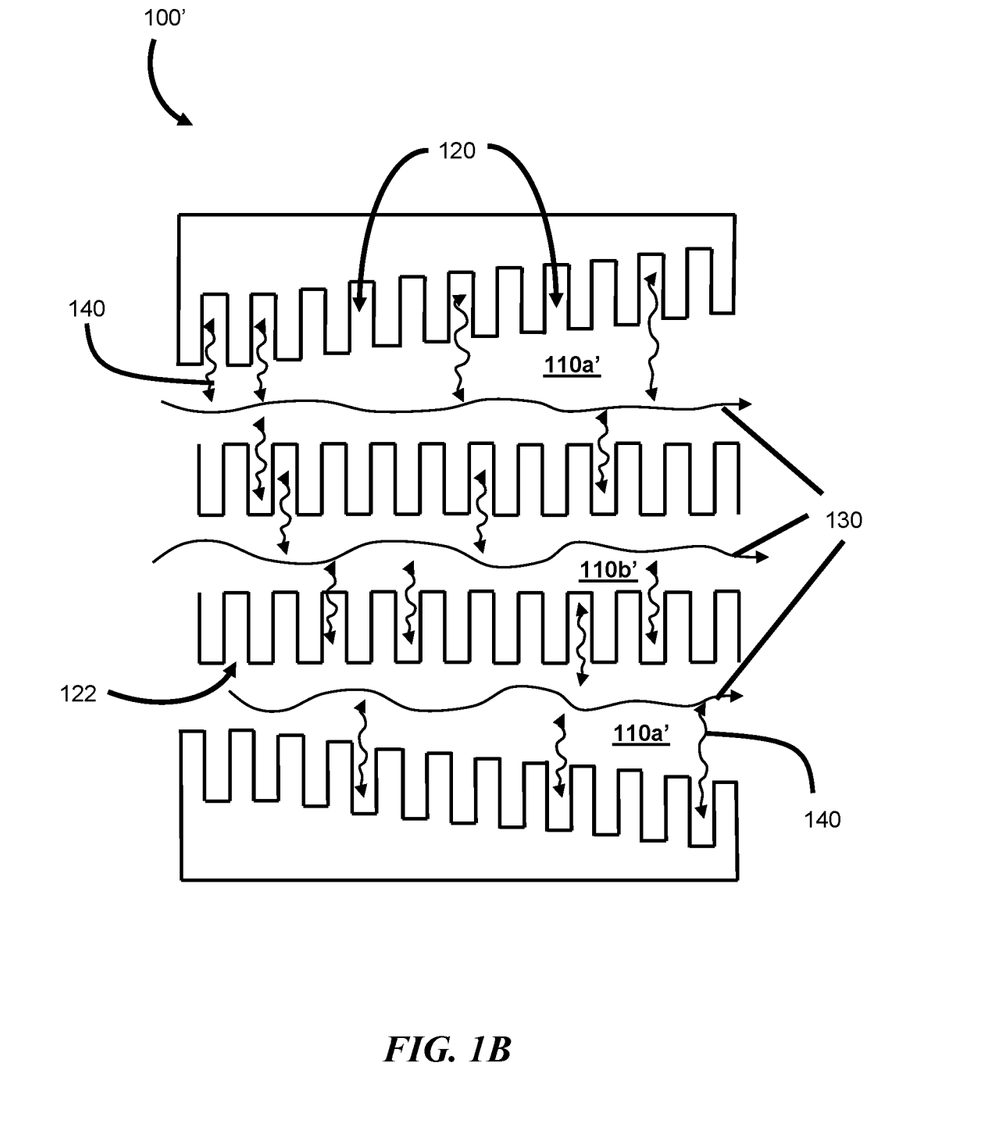
FIG. 1B is a schematic illustration of a chromatographic device with a primary channel with a variable cross-sectional area according to various aspects and embodiments of the inventions.

FIGS. 1A and 1B show schematic views of a chromatographic device 100, 100' according to various aspects and embodiments of the present inventions. The device comprises a primary channel 110, 110a', 110b' and secondary channels 120 intersecting a primary channel. As illustrated, the secondary channels have openings 122 that intersect a primary channel at about 90 degrees (substantially perpendicular), however, it is to be understood that the angle of intersection is not critical, and angles of interaction greater than about 20 degrees fall within various embodiments of the invention. The cross-sectional area of the primary channel is chosen such that the flow 130 within the primary channel (represented by a single-headed arrow line, with the arrow indicating the direction of convective flow) is substantially convective and the dimensions of the secondary channels are chosen such that the flow 140 into and out of a secondary channel (represented by the squiggly double-headed arrow lines) is substantially diffusive.

The cross-sectional area of a primary channel need not be constant, and in various embodiments the cross-sectional area of a primary channel varies along the flow path. One such variation is illustrated in FIG. 1B where certain primary flow channels 110a' are illustrated as increasing in cross-sectional area along the flow path. In various embodiments, the cross-sectional area of a primary channel changes in cross sectional area to maintain a substantially convective flow within the primary channel. In various embodiments, the cross-sectional area of the primary channel changes to change the flow velocity, for example to permit more or less time for solutes to diffuse into and out of a secondary channel.

FIGS. 1A and 1B schematically illustrate a chromatographic device according to various embodiments of the inventions with multiple primary channels. Although only three channels are illustrated, it is to be understood that given the scale of the channels that embodiments comprising tens, hundreds and thousands of primary channels are within in the various embodiments of the inventions. Further, although FIGS. 1A and 1B illustrate the secondary channels as approximately of equal cross-sectional area and length, it is to be understood that both the length and cross-sectional areas of the secondary channels can vary and that the cross-sectional area of a given channel can vary along its length.

In various aspects, the length of the primary channel path is selected such that sufficient chromatographic separation of analytes of interest is achieved through interactions with the surfaces inside the secondary channels. For example, in various embodiments, a primary channel has a length between about 1 cm and about 100 cm.

Figure 1C:
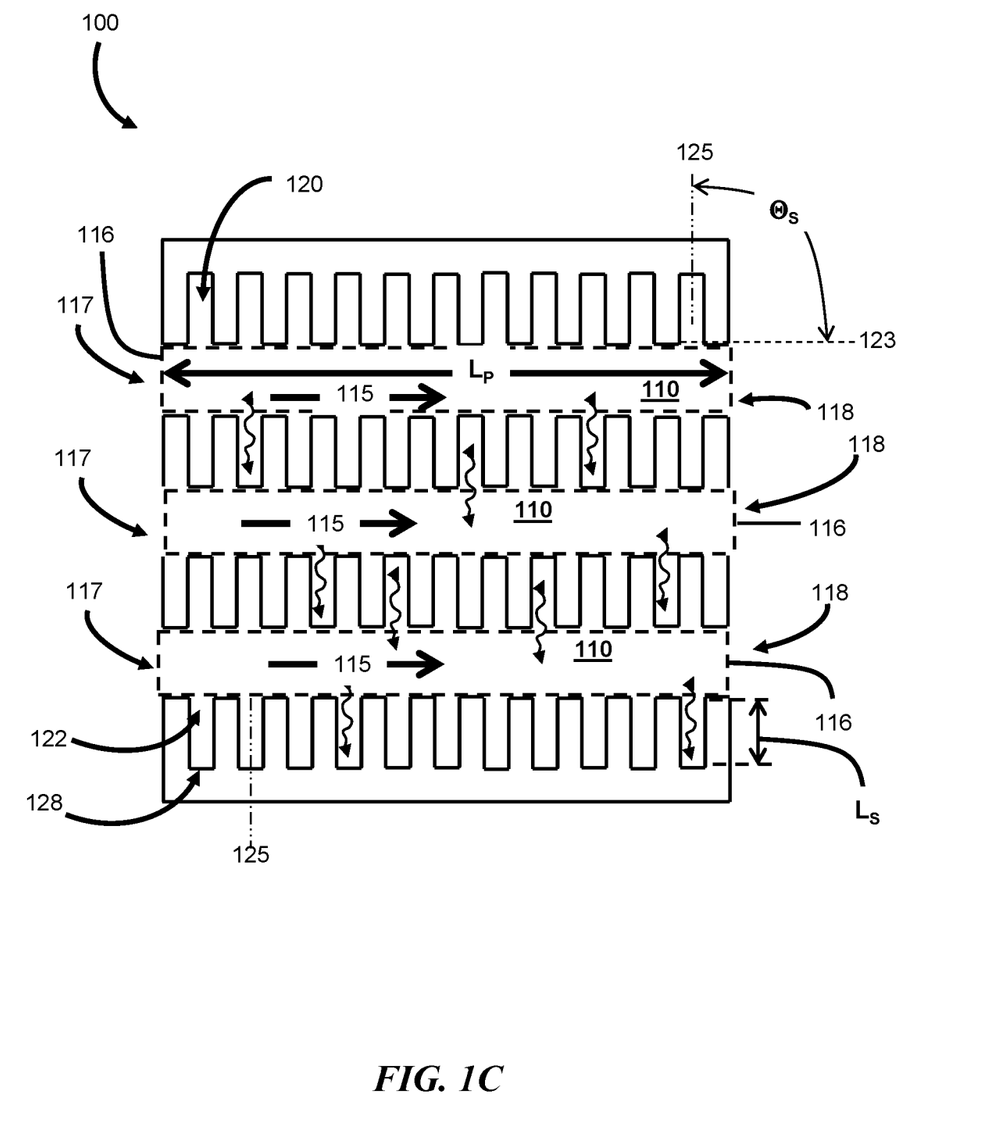
FIG. 1C is a schematic illustration of a chromatographic device according to various aspects and embodiments of the inventions and further illustrating various configurational concepts of the inventions.
Figure 1D:
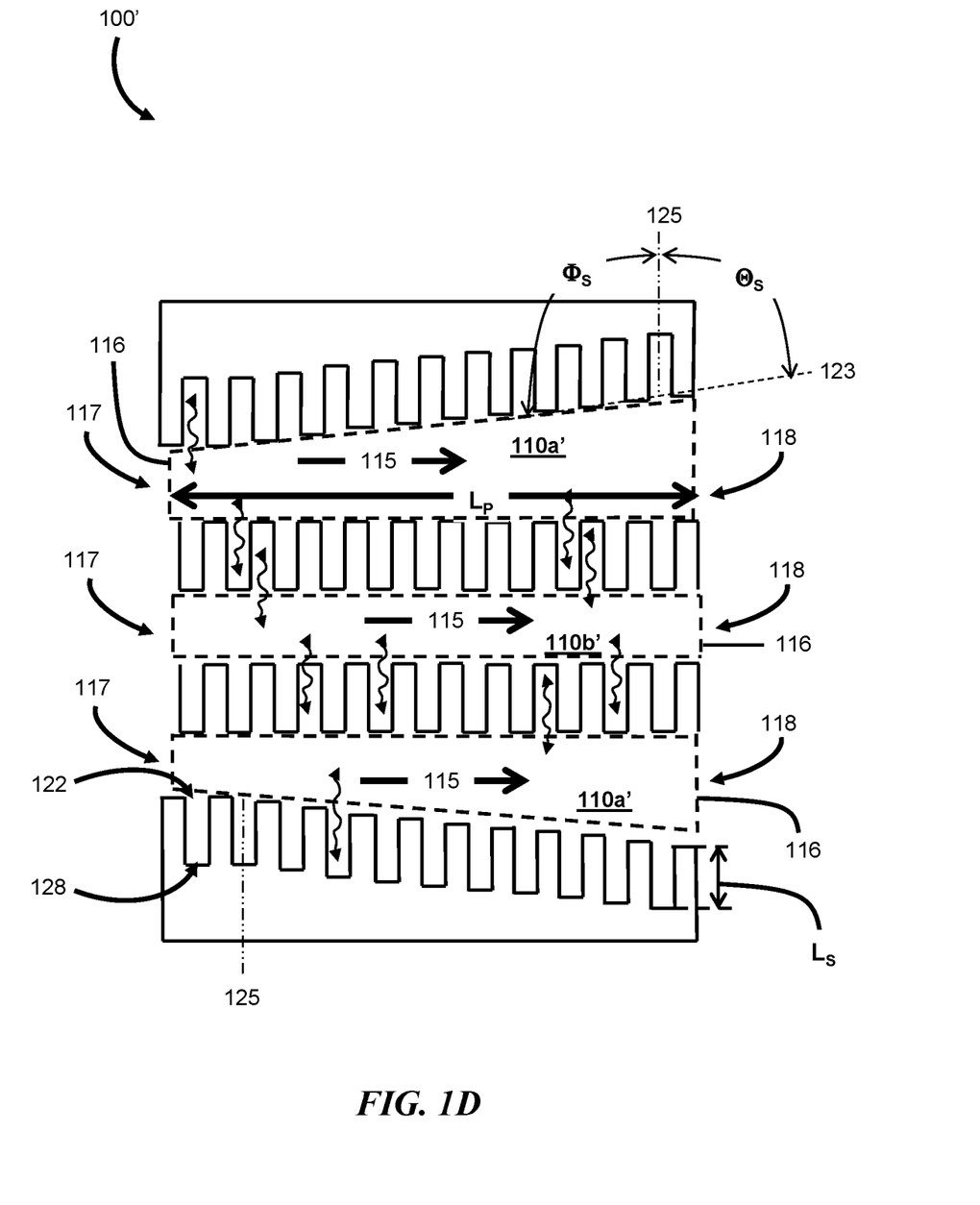
FIG. 1D is a schematic illustration of a chromatographic device with a primary channel with a variable cross-sectional area according to various aspects and embodiments of the inventions and further illustrating various configurational concepts of the inventions.

Further configurational concepts of the various embodiments of the inventions are illustrated in FIGS. 1C and 1D. For example, the cross-sectional area of the primary channel 110, 110a', 110b' is the area of the primary channel in the plane perpendicular to the convective flow direction 115 and the cross-sectional area over the length of a primary channel represents the volume 116 (illustrated as the area within the dashed figure) of the primary channel 110, 110a', 110b'. The length of a primary channel $L_P$ is the length from the inlet 117 to the outlet of the channel 118. The opening of a secondary channel 122 intersects 123 (dashed line) a primary channel 110, 110a', 110b' at an angel $\Theta_S$, and the cross-sectional area of a secondary channel 120 is the area of the secondary channel in the plane perpendicular the primary axis down the geometric center of a secondary channel 125 (dashed line), and the length $L_S$ of a secondary channel is the length from the inlet 122 to an outlet or an end 128 of the secondary channel. It is to be understood that the angle of intersection $\Theta_S$ as used herein is the smaller included angle and not the larger included angle $\Phi_S$ and that the relation between the smaller and larger included angels is $\Theta_S+\Phi_S=180$ degrees.

Figure 2:
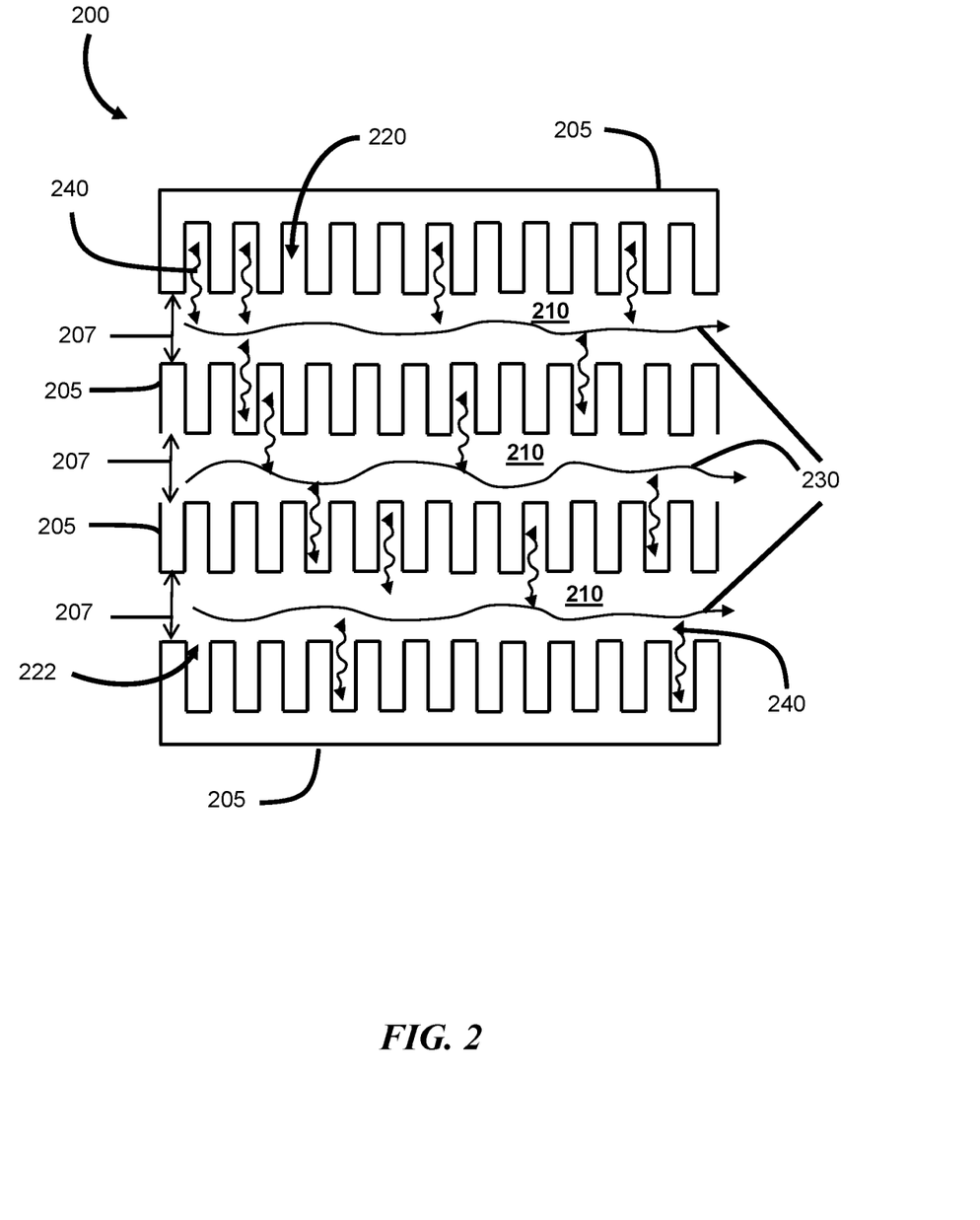
FIG. 2 is a schematic illustration of a chromatographic device comprised of stacked diffusive media elements according to various aspects and embodiments of the inventions.

Referring to FIG. 2, in various embodiments, the chromatographic devices 200 of the present inventions are formed from stacks of diffusive media elements 205 spaced apart from each other a separation distance 207 to define a primary channel 210 between two respective diffusive media elements 205 where the separation distance is such that fluid flow 230 within the primary channel is substantially convective. It is to be understood that the separation distance need not be the same between all diffusive media elements and that in various embodiments the separation distance varies between two of more sets of diffusive media elements. Referring again to FIG. 2, each diffusive media element 205 comprises a plurality of secondary channels 220 each being in fluidic communication with a primary channel 210 and wherein the cross-sectional area of each secondary channel is such that fluid flow 240 into and out of a secondary channel is substantially diffusive. In various embodiments, of a stacked media chromatographic device each diffusive media element is formed on a substrate comprising a plurality of secondary channels and a partial portion of the primary channel.

Figure 3A:
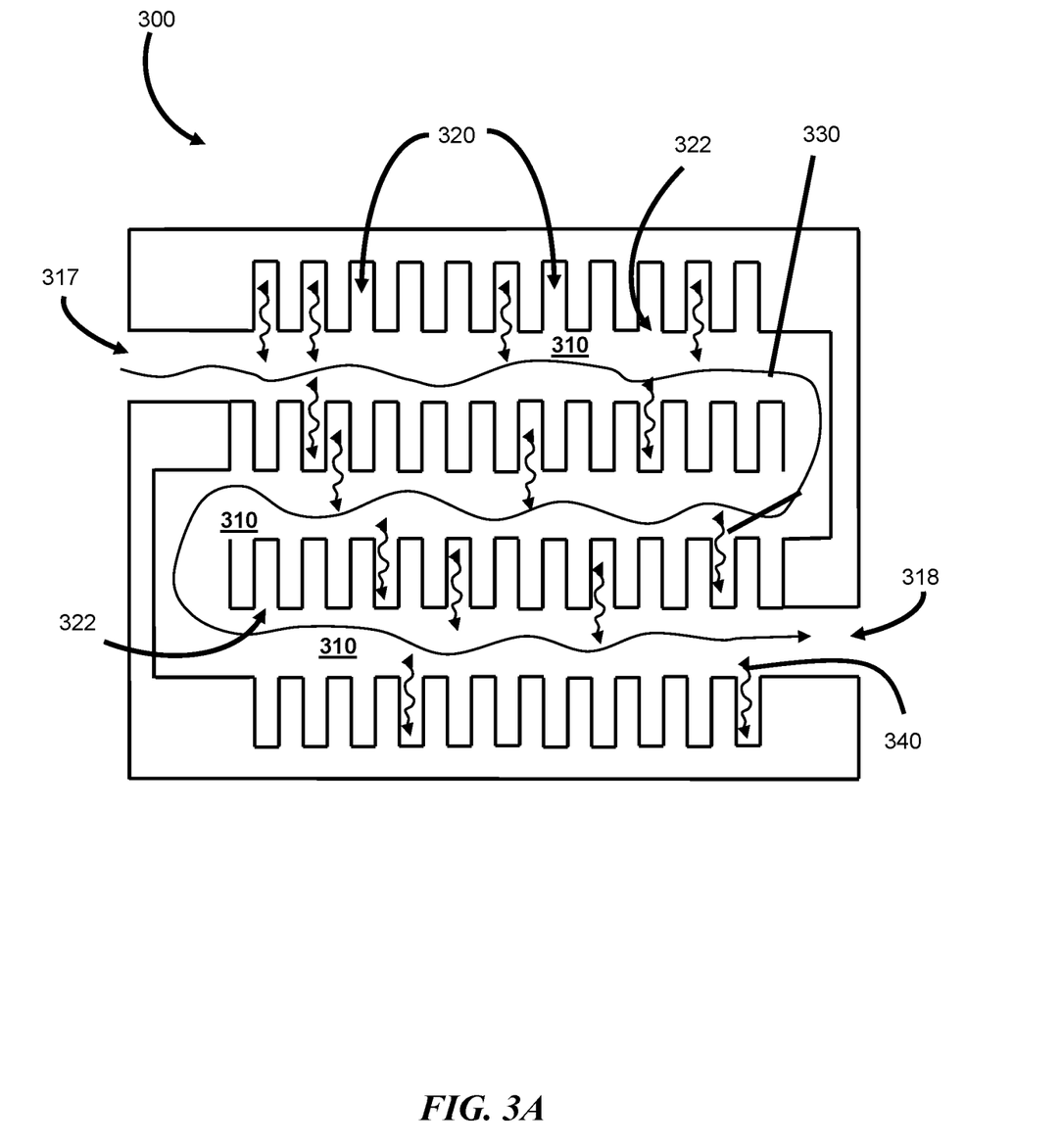
FIG. 3A is a schematic illustration of a chromatographic device with a serpentine primary channel flow path and secondary channels with inlets that intersect the primary channel at about 90 degrees according to various aspects and embodiments of the inventions.
Figure 4A:
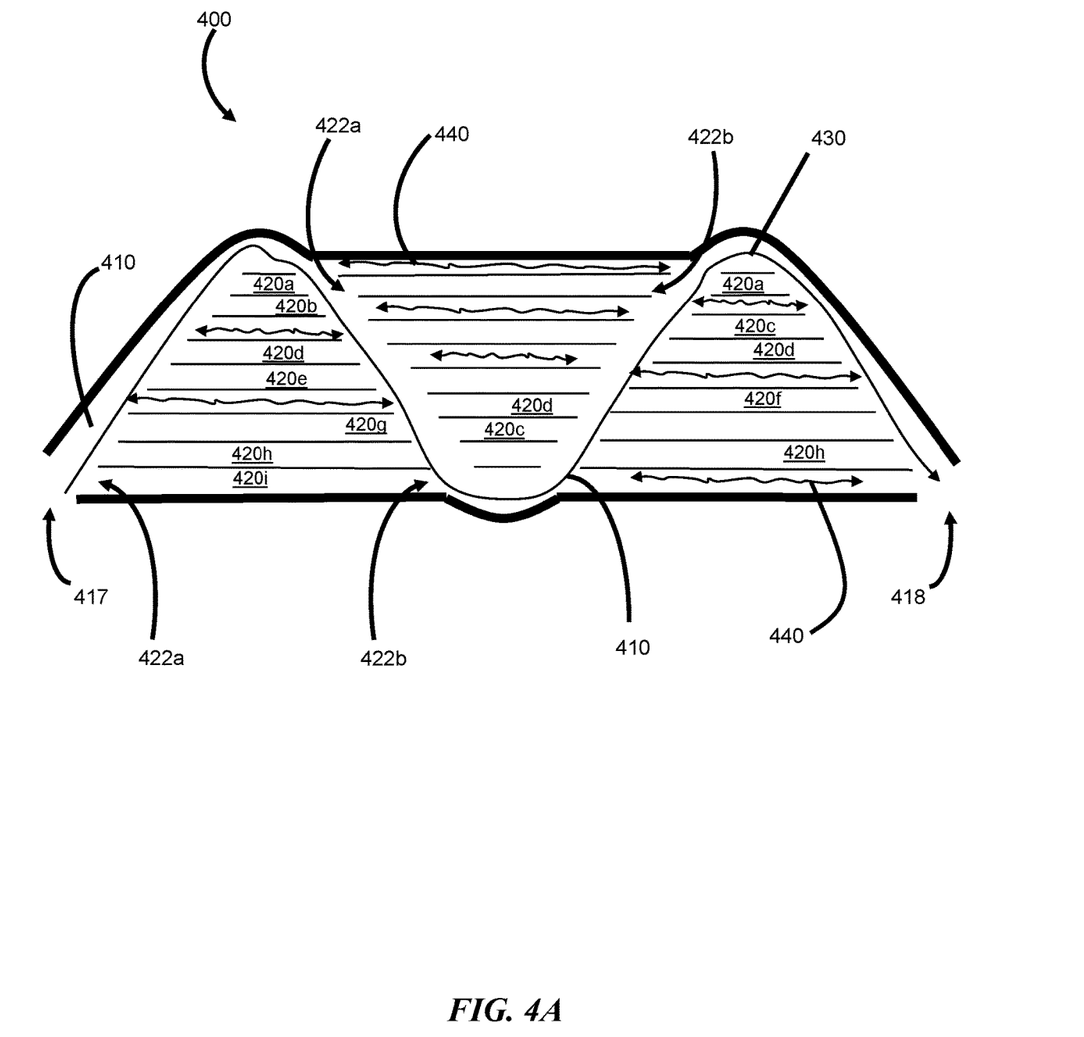
FIG. 4A is a schematic illustration of a chromatographic device with a sinusoidal primary channel flow path and secondary channels with inlets that intersect the primary channel at less than 90 degrees according to various aspects and embodiments of the inventions.

In various embodiments, the primary channel follows a non-linear path. For example, referring to FIG. 3A, in various embodiments a chromatographic device 300 comprises a primary channel 310 that follows a path 330 with a series of substantially 180 degree turns from the inlet 317 to the outlet 318. In various embodiments, the primary channel 310 may follow a substantially serpentine path that weaves or winds back and forth. Referring to FIG. 4A, in various embodiments a chromatographic device 400 comprise a primary channel 410 that follows a substantially sinusoidal flow path 430 from the inlet 417 to the outlet 418.

Referring again to FIG. 3A, the chromatographic device 300 further comprises a plurality of secondary channels 320 intersecting a primary channel. As illustrated, the secondary channels have openings 322 that intersect a primary channel at about 90 degrees (substantially perpendicular), however, it is to be understood that the angle of intersection is not critical, and angles of interaction greater than about 20 degrees fall within various embodiments of the invention. The cross-sectional area of the primary channel is chosen such that the flow 330 within the primary channel (represented by a singled headed arrow line, with the arrow indicating the direction of convective flow) is substantially convective and the dimensions of the secondary channels are chosen such that the flow 340 into and out of a secondary channel (represented by the squiggly double arrow headed lines) is substantially diffusive.

Figure 3B:
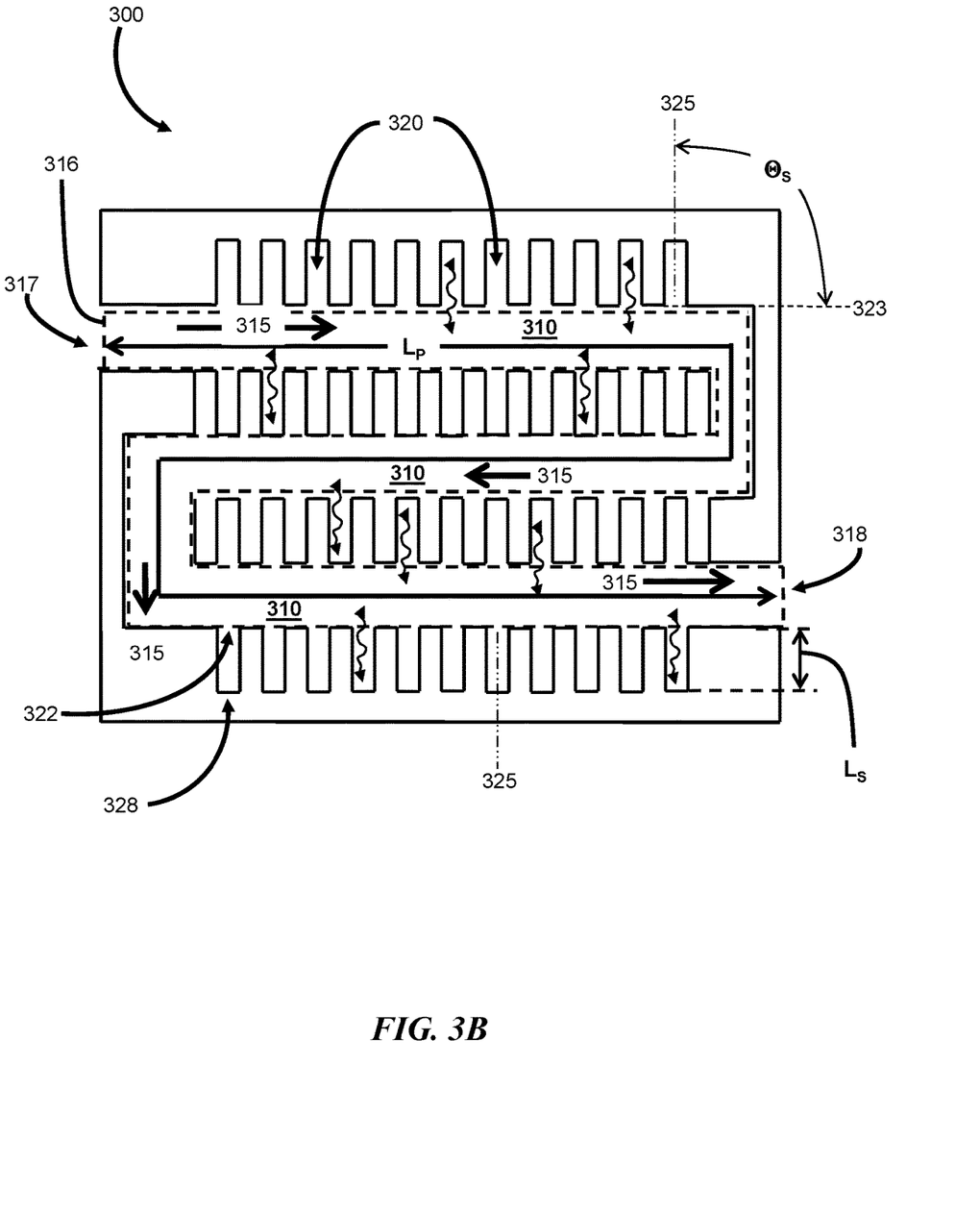
FIG. 3B is a schematic illustration of a chromatographic device with a serpentine primary channel flow path according to various aspects and embodiments of the inventions and further illustrating various configurational concepts of the inventions.

Referring to FIG. 3B, the configurational concepts of chromatographic devices employing a non-linear flow path are similar to those for embodiments employing substantially linear flow paths. For example, the cross-sectional area of the primary channel 310 is the area of the primary channel in the plane perpendicular to the convective flow direction 315 along the flow path but it is to be understood that this direction changes as the flow path turns. The cross-sectional area over the length of a primary channel represents the volume 316 (illustrated as the area enclosed within the dashed figure) of the primary channel. The length of a primary channel $L_P$ is the length from the inlet 317 to the outlet of the channel 318, including bends, and is traced down the geometric center of the primary channel. The opening of a secondary channel 322 intersects 323 (dashed line) the primary channel 310 at an angel $\Theta_S$, and the cross-sectional area of a secondary channel 320 is the area of the secondary channel in the plane perpendicular to the primary axis down the geometric center of a secondary channel 325 (dashed line), and the length $L_S$ of a secondary channel is the length from the inlet 322 to an outlet or an end 328 of the secondary channel. It is to be understood that the angle of intersection $\Theta_S$ as used herein is the smaller included angle and not the larger included angle $\Phi_S$ and that the relation between the smaller and larger included angels is $\Theta_S+\Phi_S=180$ degrees.

Referring again to FIG. 4A, various embodiments of the chromatographic device 400 comprise a primary channel 410 that follows a non-linear flow path 430 from the inlet 417 to the outlet 418 and a plurality of sets of secondary channels 420a, 420b, 420c, . . . , etc. each having a first opening 422a and a second opening 422b both in fluidic communication with the primary channel 410. The cross-sectional area of the primary channel is chosen such that the flow 430 within the primary channel (represented by a singled headed arrow line, with the arrow indicating the direction of convective flow) is substantially convective and the dimensions of the secondary channels are chosen such that the flow 440 into and out of a secondary channel (represented by the squiggly double arrow headed lines) is substantially diffusive.

The lengths of each secondary channel in a set of secondary channels vary 420a, 420b, 420c, . . . , etc., and in various embodiments, one or more cross-sectional dimensions vary between the sets of secondary channel. It is to be understood that although FIG. 4A illustrates regularly repeating sets of secondary channels, that such repetition is not necessary and that sets of secondary channel lengths need not repeat along the length of the primary channel.

Figure 4B:
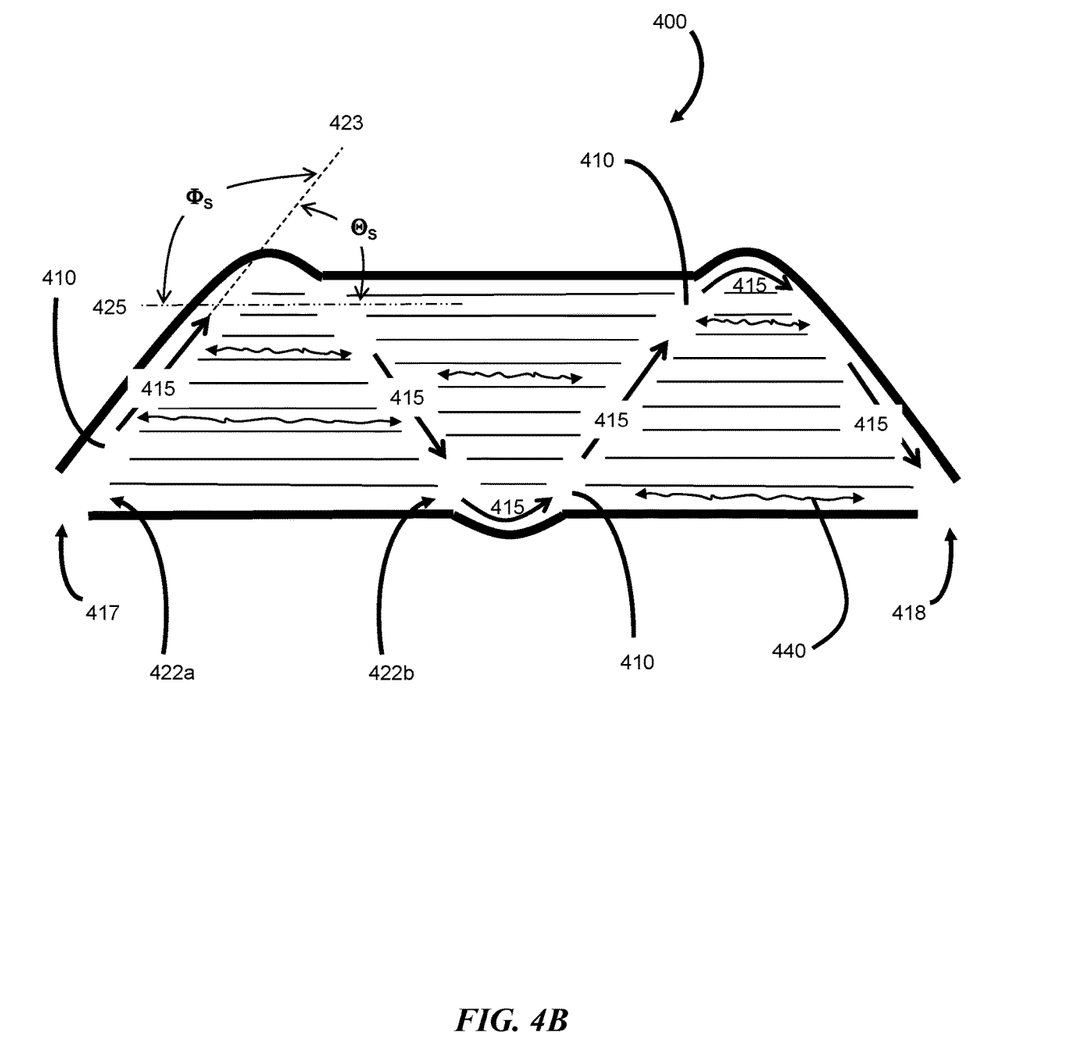
FIG. 4B is a schematic illustration of a chromatographic device with a sinusoidal primary channel flow path according to various aspects and embodiments of the inventions further illustrating various configurational concepts of the inventions.

In various embodiments, referring to FIGS. 4A and 4B, the first opening 422a and the second opening 422b of each secondary channel intersects the primary channel at an angle $\Theta_S$ between about 20 degrees and about 85 degrees, where the geometric center of a primary channel 423 (dotted line) is parallel to the flow direction 415 in the primary channel 410. In one embodiment, the angle $\Theta_S$ may be selected such that the convective flow speed and the diffusive flow speed are the same or similar. It is to be understood that the angle of intersection of a first opening of a secondary channel can differ from the angle of intersection of the second opening and that the angle of intersection $\Theta_S$ as used herein is the smaller included angle and not the larger included angle $\Phi_S$ and that the relation between the smaller and larger included angels is $\Theta_S+\Phi_S=180$ degrees.

The cross-sectional area of the primary channel 410 is the area of the primary channel in the plane perpendicular to the convective flow direction 415 along the flow path but it is to be understood that this direction changes as the flow path progresses. The cross-sectional area over the length of a primary channel represents the volume of the primary channel. The length of a primary channel $L_P$ is the length from the inlet 417 to the outlet of the channel 418, including bends, and is traced down the geometric center of the primary channel. The cross-sectional area of a secondary channel 420 is the area of the secondary channel in the plane perpendicular to the primary axis down the geometric center of a secondary channel 425 (dashed line), and the length $L_S$ of a secondary channel is the length from the first opening 422a to the second opening 422b.

Figure 5:
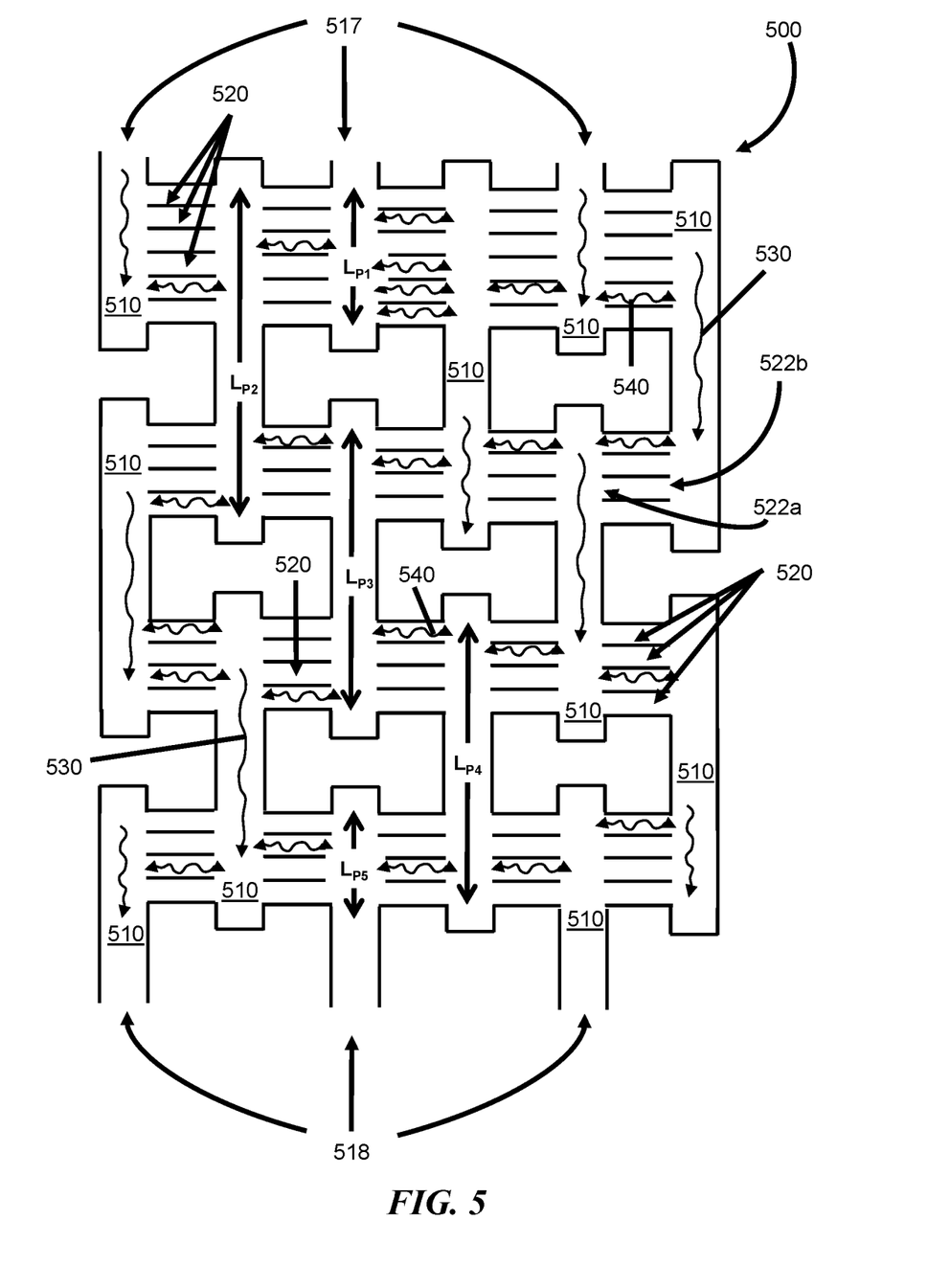
FIG. 5 is a schematic illustration of a chromatographic device with a discontinuous primary channel flow path according to various aspects and embodiments of the inventions

Referring to FIG. 5, in various aspects and embodiments, the chromatographic devices of the present inventions comprise a structure having inlets 517 onto a plurality of discontinuous primary channels 510 and outlets 518 from a plurality of primary channels, the primary channels having dimensions such that fluidic flow 530 within a primary channel (represented by a singled headed arrow line, with the arrow indicating the direction of convective flow) is substantially convective, and a plurality of secondary channels 520 intersecting and at least a portion of the secondary channels interconnecting primary channels 510, where the secondary channels have dimensions such that fluidic flow 540 into and out of a secondary channel (represented by the squiggly double arrow headed lines) is substantially diffusive. As illustrated, the secondary channels have openings 522a, 522b that intersect a primary channel at about 90 degrees (substantially perpendicular), however, it is to be understood that the angle of intersection is not critical, and angles of interaction greater than about 20 degrees fall within various embodiments of the invention. The length of a primary channel $L_P$ is the sum of a single series of primary channels along a single dimension. For example, in the context of FIG. 5, the length of a primary channel can be given by $L_P=L_{P1}+L_{P2}+L_{P3}+L_{P4}+L_{P5}$.

As discussed, in the various aspects and embodiments of the present inventions, fluidic flow in a primarily channel is substantially convective. For example, in various embodiments fluid flow in a primary channel is substantially convective with the primary channel having a Péclet number greater than about 2 under conditions of operation. In various embodiments fluid flow in a primary channel is substantially convective with the primary channel having a Péclet number greater than about 1 under conditions of operation, and, in various embodiments, fluid flow in a primary channel is substantially convective with the primary channel having a Péclet number greater than about 3 under conditions of operation. In other embodiments, the Péclet number may be between 1 to 10 in the primary channel during fluid flow.

As discussed, in the various aspects and embodiments of the present inventions, fluidic flow into and out of a secondary channel is substantially convective. For example, in various embodiments, fluid flow in a secondary channel is substantially diffusive with the secondary channel having a Péclet number less than about 0.2 under conditions of operation. In various embodiments fluid flow in a secondary channel is substantially convective with the secondary channel having a Péclet number less than about 0.1 under conditions of operation, and, in various embodiments, fluid flow in a secondary channel is substantially convective with the secondary channel having a Péclet number less than about 0.15 under conditions of operation. Various embodiments are contemplated having a Péclet number for the secondary channels during fluid flow between greater than 0 and less than 0.2.

In various aspects, the length of the primary channel path is selected such that sufficient chromatographic separation of analytes of interest is achieved through interactions with the surfaces inside the secondary channels. For example, in various embodiments, a primary channel has a length between about 1 cm and about 100 cm. In various embodiments comprising discontinuous primary channels the primary channel length is the sum of the length of the primary channels in a single dimension.

In various embodiments, the length of a secondary channel is selected based on the diffusivity of one or more analytes of interest. For example, in various embodiments, the lower the diffusivity of an analyte of interest the greater the length of the secondary channel. In various embodiments, the length of the secondary channel may be between 5 and 5000 nm.

In various embodiments, the angle that a secondary channel intersects a primary channel is selected based on the diffusivity of an analyte of interest. For example, the angle of intersection may be greater than 20 degrees.

Further contemplated is chromatographic methods that include providing a chromatographic device comprising a primary channel, and a plurality of secondary channels each having an entrance in fluidic communication with the primary channel wherein the entrance intersects the primary channel. The methods may include introducing an analyte through each of the primary and secondary channels of the chromatographic device, wherein the Péclet number for the analyte in the primary channel is between 1 and 10 and the Péclet number for the analyte in each of the secondary channels is less than 0.2, where a diffusion coefficient of the analyte is between about $1\times10^{-7}$ m$^2$/s to about $1\times10^{-12}$ m$^2$/s. Methods may include moving the analyte through the primary channel at a linear velocity in the range of between about 0.0001 m/s and about 1 m/s. Methods may include receiving in the chromatographic device a fluid containing analytes having a diffusion coefficient between about $1\times10^{-9}$ m$^2$/s to about $1\times10^{-10}$ m$^2$/s.

While the invention has been shown and described with reference to specific preferred embodiments, it should be understood by those skilled in the art that various changes in form and detail may be made therein without departing from the scope of the invention as defined by the following claims.

What is claimed is:

1. A chromatographic method, comprising:
   providing a chromatographic device comprising:
   a plurality of diffusive media elements spaced apart from each other a separation distance;
   a primary channel defined between the plurality of diffusive media elements having a cross-sectional area and characteristic length such that analyte travel within the primary channel is substantially convective; and
   a plurality of secondary channels located in each diffusive media element, each having a cross-sectional area and characteristic length such that analyte flow into and out of a secondary channel is substantially diffusive, each of the plurality of secondary channels having an entrance in fluidic communication with the primary channel wherein the entrance intersects the primary channel, wherein the secondary channels have a closed end; and
   introducing an analyte through each of the primary and secondary channels of the chromatographic device, wherein the Péclet number for the analyte in the primary channel is between 1 and 10 and the Péclet number for the analyte in each of the secondary channels is less than 0.2, wherein a diffusion coefficient of the analyte is between about $1\times10^{-7}$ m$^2$/s to about $1\times10^{-12}$ m$^2$/s.

2. The chromatographic method of claim 1, wherein the analyte transport in the primary channel is at least substantially convective, and wherein the analyte transport in the secondary channel is at least substantially diffusive.

3. The chromatographic method of claim 1, wherein each of the plurality of secondary channels intersects the primary channel at an angle between about 10 degrees and about 90 degrees.

4. The chromatographic method of claim 1, wherein the cross sectional area of the primary channel varies along the length of the primary channel.

5. The chromatographic method of claim 1, wherein the chromatographic device has a fluid inlet and a fluid outlet and the primary channel follows a substantially linear path from the inlet to the outlet.

6. The chromatographic method of claim 1, wherein the chromatographic device has a fluid inlet and a fluid outlet and the primary channel follows a path with a series of substantially serpentine turns from the inlet to the outlet.

7. The chromatographic method of claim 1, wherein the secondary channels vary in at least one of diameter and length.

8. The chromatographic method of claim 1, wherein at least a portion of the surface of the primary channel is surface modified with a material selected to be chromatographically active with the analyte or a substance carrying the analyte.

9. The chromatographic method of claim 1, wherein at least a portion of the surface of at least a portion of the secondary channels is surface modified with a material selected to be chromatographically active with the analyte or a substance carrying the analyte.

10. The chromatographic method of claim 1, wherein the primary channel comprises a plurality of channels.

11. A chromatographic device, comprising:
a plurality of diffusive media elements spaced apart from each other a separation distance;
a primary channel defined between the plurality of diffusive media elements having a cross-sectional area and characteristic length such that analyte travel within the primary channel is substantially convective; and
a plurality of secondary channels located in each diffusive media element, each having a cross-sectional area and characteristic length such that analyte flow into and out of a secondary channel is substantially diffusive, each of the plurality of secondary channels having an entrance in fluidic communication with the primary channel wherein the entrance intersects the primary channel, wherein the secondary channels have a closed end.

12. The chromatographic device of claim 11, wherein a first opening and a second opening of each secondary channel intersects the primary channel at an angle between about 10 degrees and about 90.

13. The chromatographic device of claim 11, wherein the cross sectional area of the primary channel varies along the length of the primary channel.

14. The chromatographic device of claim 11, wherein the chromatographic device has a fluid inlet and a fluid outlet and the primary channel follows a substantially linear path from the inlet to the outlet.

15. The chromatographic device of claim 11, wherein the chromatographic device has a fluid inlet and a fluid outlet and the primary channel follows a path with a series of substantially serpentine turns from the inlet to the outlet.

16. The chromatographic device of claim 11, wherein the secondary channels vary in at least one of length and diameter.

17. The chromatographic device of claim 11, wherein at least a portion of the surface of the primary channel is surface modified with a material selected to be chromatographically active with the analyte or a substance carrying the analyte.

18. The chromatographic method of claim 11, wherein the primary channel comprises a plurality of channels.

19. The chromatographic device of claim 11, further comprising the analyte flowing between the plurality of diffusive media elements, wherein the Pećlet number for the analyte in the primary channel is between 1 and 10 and the Pećlet number for the analyte in the secondary channels is less than 0.2.

20. The chromatography device of claim 11, wherein the primary and secondary channels are configured to create separation in the analyte by physical size-exclusion.

21. A chromatographic device, comprising:
a plurality of diffusive media elements spaced apart from each other a separation distance to define a primary channel between two respective diffusive media elements, wherein the separation distance is such that analyte transport within the primary channel is substantially convective,
wherein each diffusive media element comprises a plurality of secondary channels each having a cross-sectional area and each being in fluidic communication with the primary channel and wherein the cross-sectional area of each secondary channel is such that analyte transport into and out of a secondary channel is substantially diffusive, wherein the secondary channels have a closed end.

* * * * *

UNITED STATES PATENT AND TRADEMARK OFFICE
CERTIFICATE OF CORRECTION

PATENT NO. : 11,041,834 B2  
APPLICATION NO. : 16/292610  
DATED : June 22, 2021  
INVENTOR(S) : Abhijit Tarafder, Moon Chul Jung and Edouard S. P. Bouvier Page 1 of 1

It is certified that error appears in the above-identified patent and that said Letters Patent is hereby corrected as shown below:

In the Claims

Column 16, Claim 18:
• In Line 9, in the phrase "The chromatographic method of claim 11" replace the word "method" with "device".

Column 16, Claim 20:
• In Line 17, in the phrase "The chromatography device of claim 11" replace the word "chromatography" with "chromatographic".

Signed and Sealed this  
Twenty-sixth Day of October, 2021

Drew Hirshfeld  
*Performing the Functions and Duties of the*  
*Under Secretary of Commerce for Intellectual Property and*  
*Director of the United States Patent and Trademark Office*